(12) United States Patent
Fujimoto et al.

(10) Patent No.: US 6,584,842 B2
(45) Date of Patent: Jul. 1, 2003

(54) ANGULAR VELOCITY SENSOR

(75) Inventors: Katsumi Fujimoto, Kaminiikawa-gun (JP); Keiichi Okano, Toyama (JP); Kohichi Murohashi, Yokohama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 09/882,470

(22) Filed: Jun. 14, 2001

(65) Prior Publication Data

US 2002/0073778 A1 Jun. 20, 2002

(30) Foreign Application Priority Data

Jun. 15, 2000 (JP) .......................................... 2000-179564

(51) Int. Cl.[7] .............................................. G01C 19/00
(52) U.S. Cl. ..................................... 73/504.12; 702/194
(58) Field of Search .......................... 73/504.02, 504.03, 73/504.04, 504.12; 702/189, 190, 191, 194, 196

(56) References Cited

U.S. PATENT DOCUMENTS

| 5,400,269 A | * | 3/1995 | White et al. | 702/190 |
| 5,444,639 A | * | 8/1995 | White | 708/300 |
| 5,487,015 A | * | 1/1996 | White | 702/117 |
| 5,893,054 A | * | 4/1999 | White | 702/189 |

* cited by examiner

Primary Examiner—Richard A. Moller
(74) Attorney, Agent, or Firm—Keating & Bennett, LLP

(57) ABSTRACT

An angular velocity sensor includes a vibrator. A differential amplifier circuit outputs a differential signal including a Coriolis component from the vibrator. The differential signal is converted into a digital signal by an A/D converter. A Hilbert transformer shifts the differential signal by $\pi/2$. Two multipliers squares the original differential signal and the $\pi/2$-phase-shifted differential signal, respectively, and an adder computes the sum of the squares. A square root circuit computes the square root of the sum and outputs a magnitude signal proportional to Coriolis force.

17 Claims, 6 Drawing Sheets

ANGULAR VELOCITY SENSOR

BACKGROUND OF THE INVENTION

1. Field of the Invention

The present invention relates to angular velocity sensors, and more particularly relates to an angular velocity sensor for detecting angular velocity based on the oscillation output from a vibrating gyroscope which uses a bimorph vibrator which is used in navigation systems and for correcting camera movement caused by hand shake.

2. Description of the Related Art

FIG. 4 is a perspective view of an example of a bimorph vibrator used in an angular velocity sensor. FIG. 5 is a waveform diagram of an oscillatory wave output from the bimorph vibrator shown in FIG. 4.

Referring to FIG. 4, a bimorph vibrator 1 is formed of two piezoelectric elements pasted together so that their polarization directions are opposite to each other and so that their cross sections are rectangular. The vibrator 1 vibrates in a longitudinal vibration mode so that it vibrates, in the X-axis direction, perpendicularly to the faces. When the vibrator 1 is rotated in the Z-axis direction at a particular angular velocity ($\omega$), vibrations result in a transverse vibration mode in the Y-axis direction which is perpendicular to the drive surfaces, due to Coriolis force.

The amplitude of the vibrations is proportional to the angular velocity. By utilizing this characteristic, the angular velocity value can be determined. The vibrator 1 is provided with a left electrode, a right electrode, and an overall electrode (none of which are shown). Referring to FIG. 5, an L (left) signal (a) and an R (right) signal (b) are output from the left electrode and the right electrode, respectively. The L signal and the R signal have slightly different amplitudes and phases. The difference between the L signal and the R signal is the L−R signal (c), and the sum of the L signal and the R signal is the L+R signal (d).

Concerning the L−R signal, the larger the phase lag between the L signal and the R signal, the further the zero crossing point is moved. The L−R signal is also referred to as a null difference voltage. The Coriolis force is added to the L−R signal, and the L−R signal is output as the sum of the difference and the Coriolis force. It is impossible to isolate the Coriolis force shown in FIG. 5, because the Coriolis force is not output as an actual signal. Instead, the Coriolis force is output virtually. In the following description, it is assumed that the L−R signal is the sum of the difference and the Coriolis force. The Coriolis force (e) is in phase with the L+R signal (d). The Coriolis force (e) reaches its maximum value and minimum value in the vicinity of the maximum point and the minimum point of the L+R signal (d), respectively. When the vibrator 1 is swayed from side to side, as shown in FIG. 5, the phase of the Coriolis force (e) varies. In contrast, the phase of the L signal (a) and the phase of the R signal (B) do not vary.

The above-described vibrator 1 is required to separately adjust the balance, null voltage (which is also referred to as an off-setting voltage or a neutral voltage), and sensitivity.

FIG. 6 is a block diagram of an angular velocity detecting circuit for obtaining the output of the vibrator 1 shown in FIG. 4. Referring to FIG. 6, the differential output of the vibrator 1 is amplified by a differential amplifier circuit 201. The amplitude waveform is detected by a synchronous detector circuit 202. The detected waveform is smoothed by a smoothing circuit 203 to output a DC voltage. The DC voltage is DC-amplified by a DC amplifier 204. When the DC amplifier 204 amplifies the signal, the null voltage is also amplified. Accordingly, a DC cutting circuit 205, which is formed of a filter, cuts the DC component of the output from the DC amplifier. An amplifier circuit 206 amplifies the output of the DC cutting circuit 205 and outputs an analog signal. The analog signal is converted into a digital signal by an analog-to-digital (A/D) converter 207. An angular velocity detection signal is supplied to a microprocessor 208 to suppress camera vibration movement or to perform navigation control.

In the angular velocity detecting circuit shown in FIG. 6, since the source sensitivity of the vibrator 1 is low, it is required that the DC amplifier 204 amplify the signal for a gain of 20 dB. When the reference level is shifted due to temperature characteristics of the null voltage, and when DC amplification is performed, the null voltage occasionally exceeds the supply voltage. Therefore, it is necessary to limit the degree of DC amplification. To this end, the DC cutting circuit 205 is provided, and amplification is again performed by the amplifier circuit 206. As a result, there is an increase in the number of circuit components.

Recently, significant improvements have been made in microprocessors and digital processors (digital signal processors (DSPs)). There has also been a reduction in cost. When an analog signal is converted into a digital signal at the earliest stage as possible, the total cost of a system is reduced.

In particular, for devices such as pointing devices which detect angular velocity at low cost and which require two axes, the cost of the devices increases as it becomes necessary to double the number of peripheral circuits such as the synchronous detector circuit 202, the smoothing circuit 203, and the DC amplifier 204.

SUMMARY OF THE INVENTION

Accordingly, it is an object of the present invention to provide an angular velocity sensor for directly obtaining an angular velocity signal using a relatively simple circuit configuration, and without using redundant circuits.

According to an aspect of the present invention, an angular velocity sensor is provided for driving a vibrator in the X-axis direction and for detecting angular velocity based on vibrations caused by a Coriolis force generated in the Y-axis direction when the vibrator rotates about the Z-axis. The angular velocity sensor includes a driver for generating a reference signal based on left and right signals or a differential signal output from the vibrator and driving the vibrator. A signal extracting unit extracts the left and right signals or the differential signal output from the vibrator, in which the signals include the Coriolis force. A converter converts the left and right signals or the differential signal output from the vibrator, the signals including the Coriolis force, into at least one digital signal. An arithmetic operation unit generates $\pi/2$-phase-shifted left and right signals or a $\pi/2$-phase-shifted differential signal based on the digital left and right signals or the digital differential signal, respectively, the signals being digitized by the converter, computes the sum of squares of the $\pi/2$-phase-shifted left and right signals and the original left and right signals or computes the sum of squares of the $\pi/2$-phase-shifted differential signal and the original differential signal, and computes and outputs a magnitude signal in proportion to the Coriolis force.

The arithmetic operation unit may include a phase circuit, such as a Hilbert transformer for shifting the phase of the differential signal by π/2. A first multiplier circuit may square the original differential signal. A second multiplier circuit may square the π/2-phase-shifted differential signal. An adder circuit may add the output of the first multiplier circuit and the output of the second multiplier circuit. A square root circuit may compute the square root of the output of the adder circuit.

The arithmetic operation unit may include phase circuits, such as Hilbert transformers, for shifting the phase of the respective left and right signals by π/2. First multiplier circuits may square the respective original left and right signals. Second multiplier circuits may square the respective π/2-phase-shifted left and right signals. A first adder circuit may add the squared left signal obtained by the corresponding first multiplier circuit and the squared π/2-phase-shifted left signal obtained by the corresponding second multiplier circuit. A second adder circuit may add the squared right signal obtained by the corresponding first multiplier circuit and the squared π/2-phase-shifted right signal obtained by the corresponding second multiplier circuit. A first square root circuit may compute the square root of the output of the first adder circuit. A second square root circuit may compute the square root of the output of the second adder circuit. A subtracter circuit may compute the difference between the outputs of the first and the second square root circuits, divide the difference in two, and output the halved difference.

According to the present invention, it is possible to easily extract a magnitude signal which is proportional to Coriolis force by converting L and R signals or a differential signal output from a vibrating gyroscope into a digital signal(s) and computing the sum of squares of the original signal(s) and the π/2-phase-shifted signal(s).

Other features and advantages of the present invention will become apparent from the following description of the invention which refers to the accompanying drawings.

BRIEF DESCRIPTION OF THE DRAWING(S)

DETAILED DESCRIPTION OF EMBODIMENTS OF THE INVENTION

Figure 1:
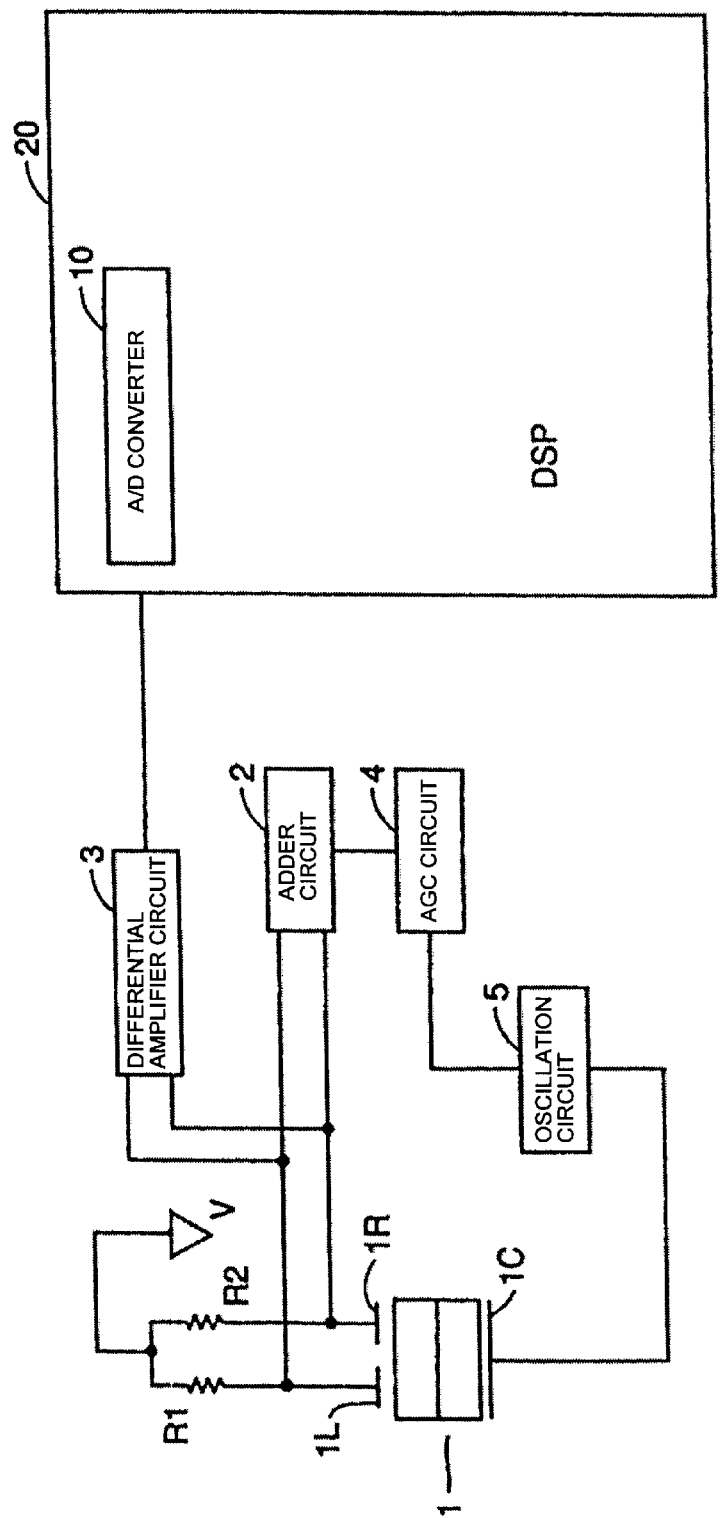
FIG. 1 is a block diagram of an angular velocity sensor according to a first embodiment of the present invention.
Figure 5:
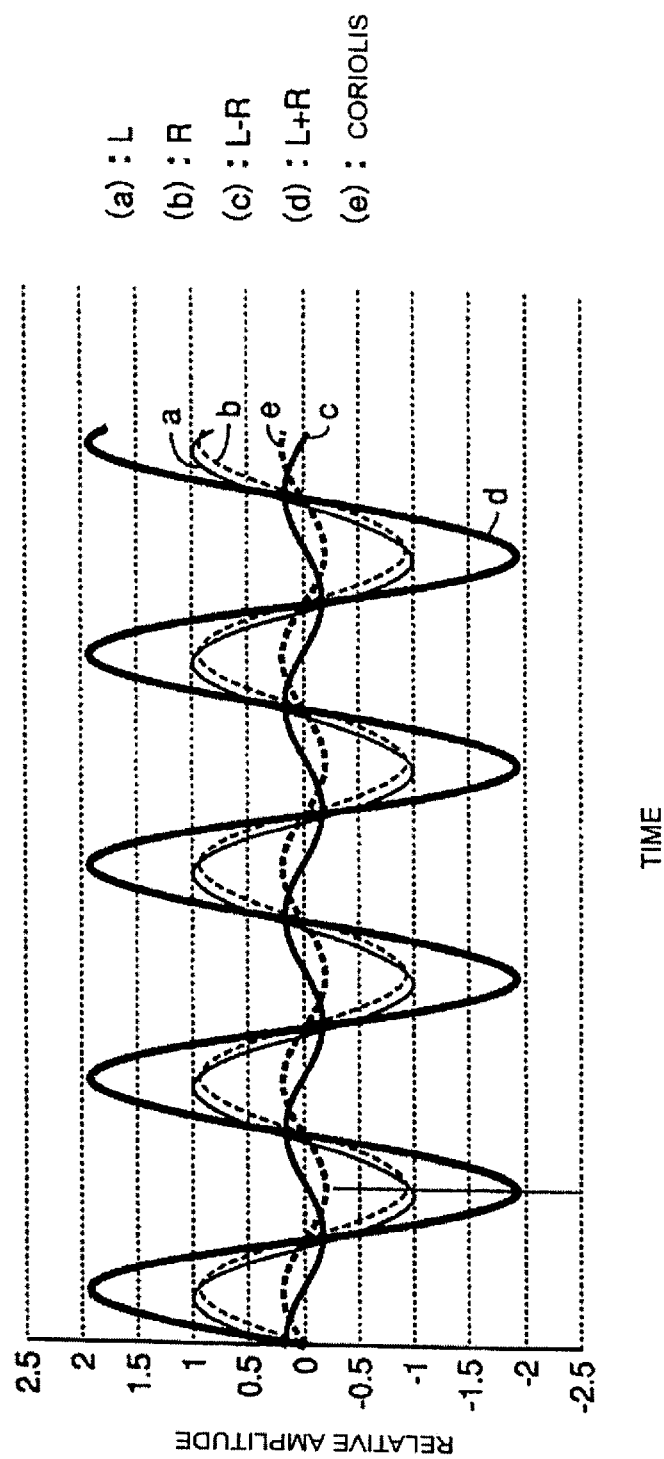
FIG. 5 is a waveform diagram of an oscillatory wave output from the bimorph vibrator.
Figure 6:
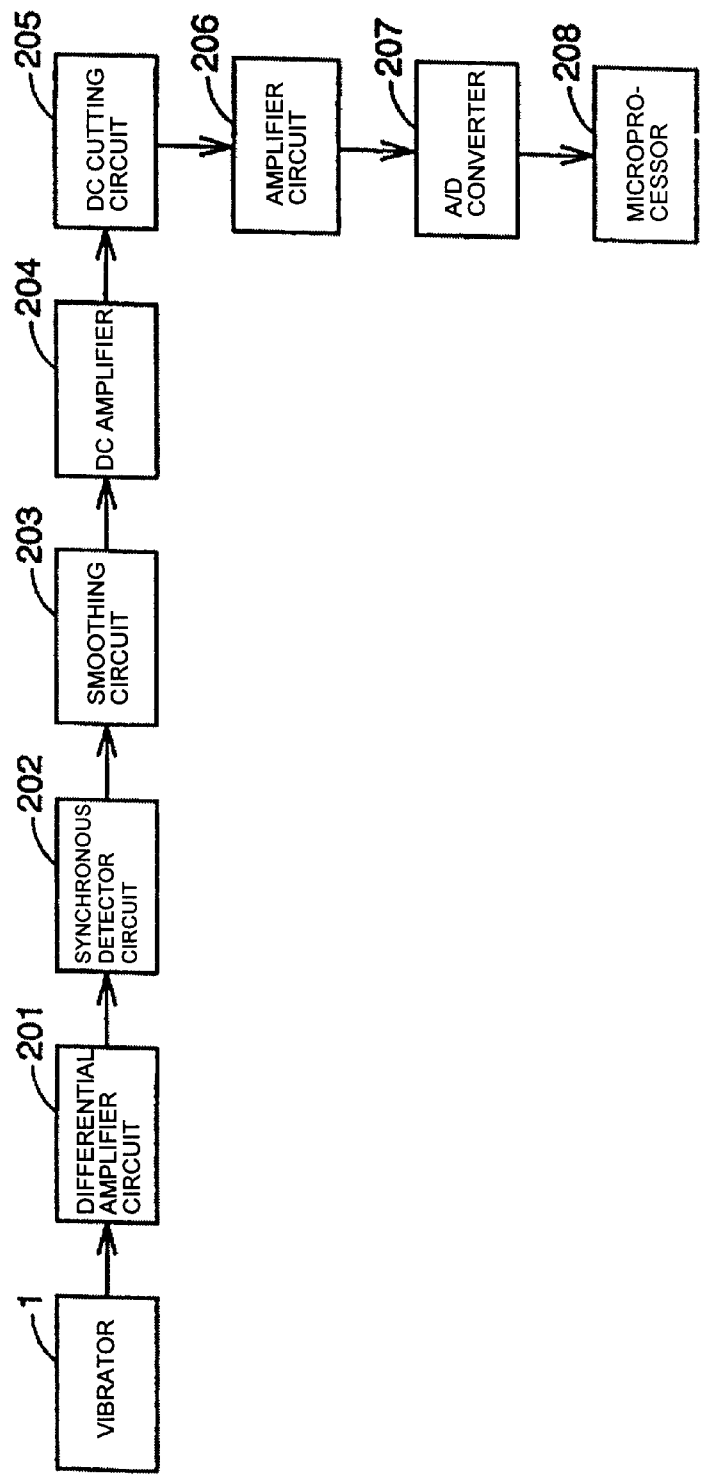
FIG. 6 is a block diagram of a conventional angular velocity detecting circuit.

FIG. 1 is a block diagram of an angular velocity sensor according to a first embodiment of the present invention. Referring to FIG. 1, a vibrator 1 includes a left electrode 1L, a right electrode 1R, and an overall electrode 1C. A voltage V is applied to the left electrode 1L and the right electrode 1R through resistors R1 and R2, respectively. The left electrode 1L and the right electrode 1R output an L signal and an R signal, which include a Coriolis force (shown in FIG. 5), respectively, to an adder circuit 2 and a differential amplifier circuit 3. The adder circuit 2 adds the L signal and the R signal and outputs an L+R signal. When the adder circuit 2 adds the L signal and the R signal, the Coriolis force is canceled and a stable feedback signal is output.

The feedback signal is sent as a reference signal to an automatic gain control (AGC) circuit 4 to produce a drive voltage at a constant level. The drive voltage is supplied to an oscillation circuit 5. The oscillation circuit 5 oscillates a signal for adjusting the phase of the output of the adder circuit 5 and supplies the signal to the overall electrode 1C. The oscillation circuit 5 adjusts the phase difference between the output of the adder circuit 2 and the drive voltage applied to the overall electrode 1C so that they are oscillated stably at a desired frequency. In the first embodiment, a phase difference of approximately zero is obtained.

The differential amplifier circuit 3 outputs an L−R signal (shown in FIG. 5) to a digital signal processor (DSP) 20. The differential amplifier circuit 3 does not necessarily output the L−R differential signal to the DSP 20. Instead, the L signal and the R signal can be supplied to the DSP 20 separately.

Figure 2:
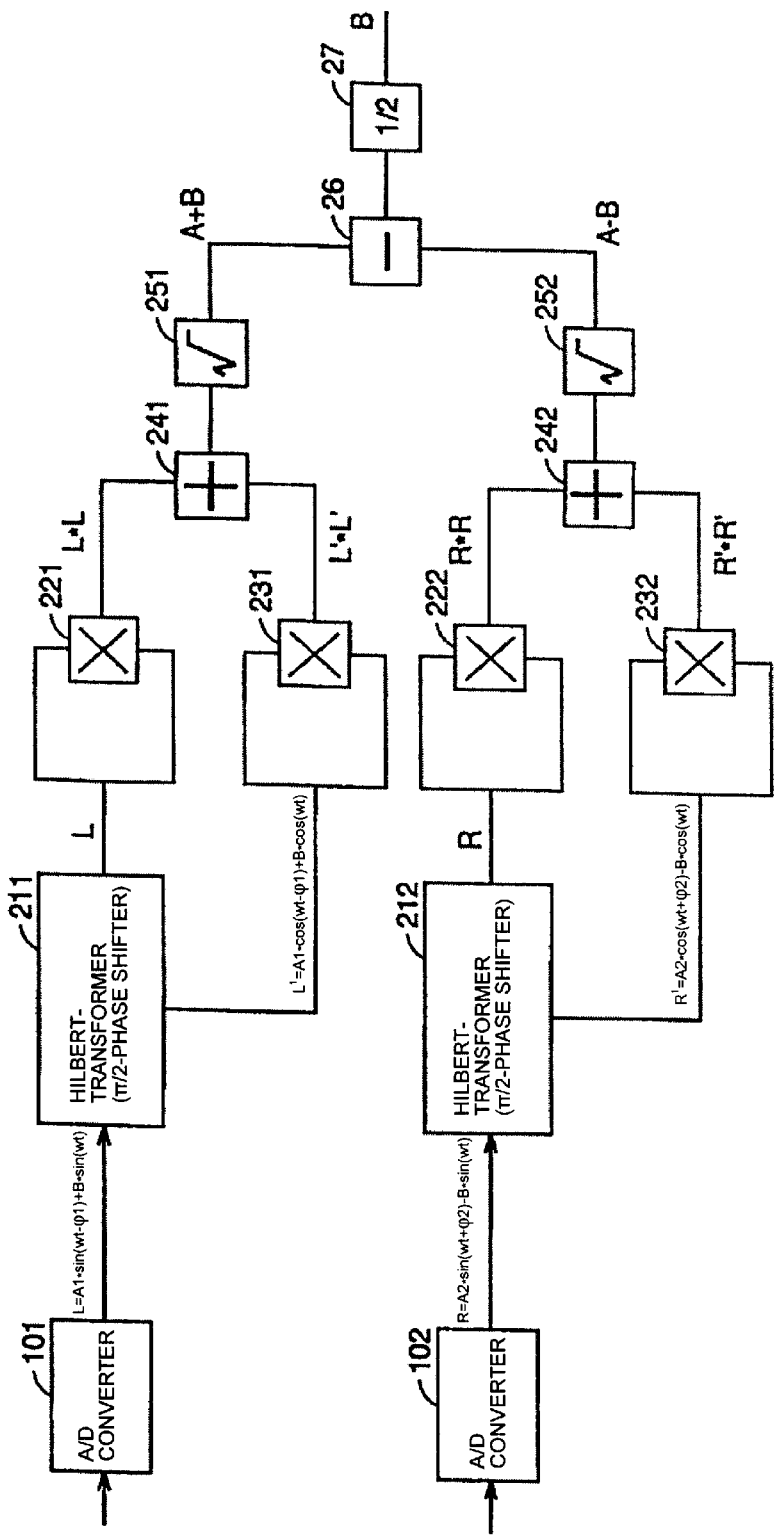
FIG. 2 is a block diagram of an example of a digital signal processor (DSP) shown in FIG. 1.

FIG. 2 is a block diagram of the structure of the DSP 20. In the example shown in FIG. 2, the L signal and the R signal are separately and directly supplied from the vibrator 1. The L signal and the R signal from the vibrator 1 are supplied to A/D converters 101 and 102, respectively, and the L and R signals are converted into digital signals. When an angular velocity is applied, the L signal and the R signal having opposite signs are output, wherein $$L = A1^*\sin(\omega t + \phi 1) + B^*\sin(\omega t) \quad (1)$$

$$R = A2^*\sin(\omega t + \phi 2) - B^*\sin(\omega t) \quad (2)$$

A1, A2: amplitude of fundamental waves

B: signal amplitude of Coriolis force

First, amplitude B is extracted from the input L signal and R signal. A Hilbert transformer 211 shifts the signal expressed as equation (1) by π/2 to produce an L' signal:

$$L' = A1^*\cos(\omega t + \phi 1) + B^*\cos(\omega t) \quad (3)$$

Multipliers 221 and 231 compute squares of the L signal and the L' signal, respectively, and an adder 241 computes the sum of the squares, which is expressed as:

$$X = L^*L + L'^*L' = (A1^*A1 + 2^*A1^*B^*\cos(\phi 1) + B^*B) \quad (4)]$$

Similarly, based on the R signal, a Hilbert transformer 212 generates an R' signal shifted by π/2. Multipliers 222 and 232 compute squares of the R signal and the R' signal, respectively, and an adder 242 computes the sum of the squares, which is expressed as:

$$Y = R^*R + R'^*R' = (A2^*A2 - 2^*A2^*B^*\cos(\phi 2) + B^*B) \quad (5)$$

In equations (4) and (5), when A1=A2=A and when φ1 and φ2=0, the following can be obtained:

$$X = (A+B)^*(A+B)$$

$$Y = (A-B)^*(A-B) \quad (6)$$

In equations (4) and (5), when t1 and t2=0, the following can be obtained:

$$X = (A+B)^*(A+B)$$

$$Y = (A-B)^*(A-B) \quad (6)$$

Based on equations (6), square root circuits 251 and 252 compute square roots of X and Y, respectively:

$$X' = \sqrt{X} = A+B$$

$$Y' = \sqrt{Y} = A-B \quad (7)$$

A subtracter 26 and a halving (½) circuit 27 are used to calculate B=(X'-Y')/2. Thus, the Coriolis amplitude is determined.

When there is a phase shift, X=(A'+B)*(A'+B)−α and Y=(A"−B)*(A"−B)−β, where A'=A*cos(φ1), A"=A*cos (φ2), α=A*A*(cos(φ1)*cos(φ1)−1), and β=A*A*(1−cos (φ2)*cos(φ2)) and where α and β denote the offset of X and Y. An initial difference factor is added to or subtracted from amplitude B. However, applications such as pointing devices require temporal variation of angular velocity input. When A, φ1, and φ2 are constant, and even when amplitude B computed based on X' and Y' differs from the true amplitude B', amplitude B is still proportional to the product of B' and a proportional constant which is undecided with respect to B'. By tracking variation with time based on the amplitude B, the true amplitude B' is not necessarily known.

In other words, the amplitude can be determined by mathematically constructing the Hilbert transformers 211 and 212 for producing π/2-phase-shifted signals based on the L and R signals obtained by the A/D converters 101 and 102. Subsequently, the signals output from each of the Hilbert transformers 211 and 212 are squared, the squares are added, and the square root of the sum is obtained. Subsequently, the square roots of the two sums are added, and the sum is halved to obtain the amplitude.

Figure 3:
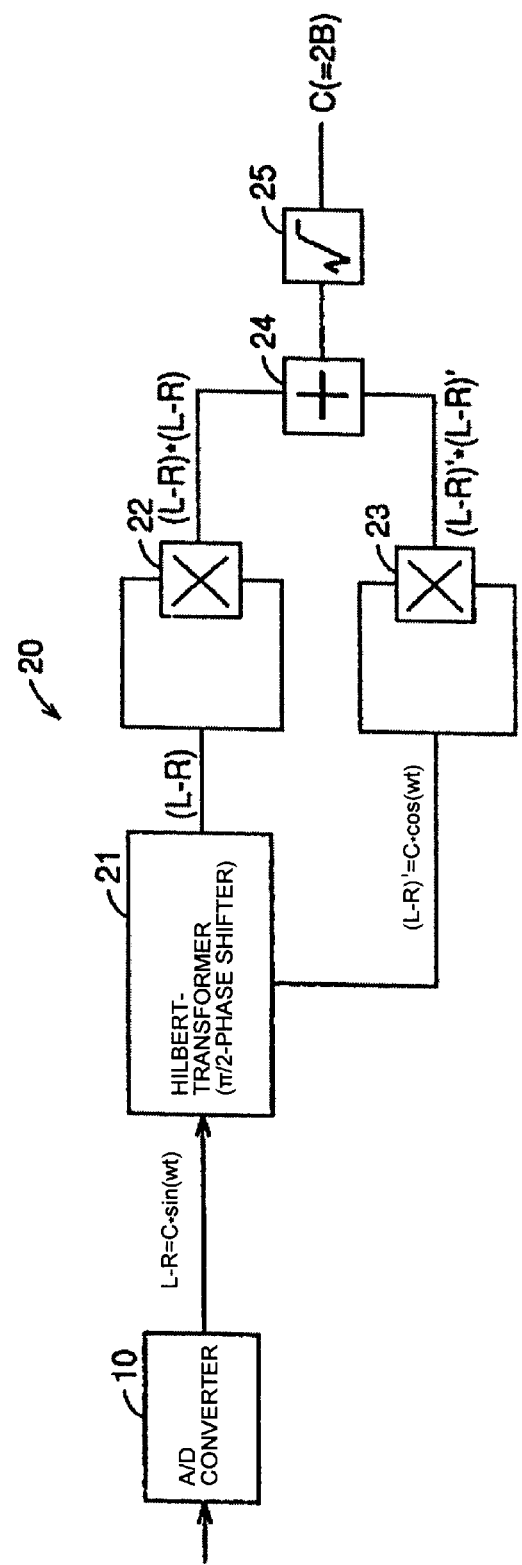
FIG. 3 is a block diagram of another example of a DSP shown in FIG. 1.
Figure 4:
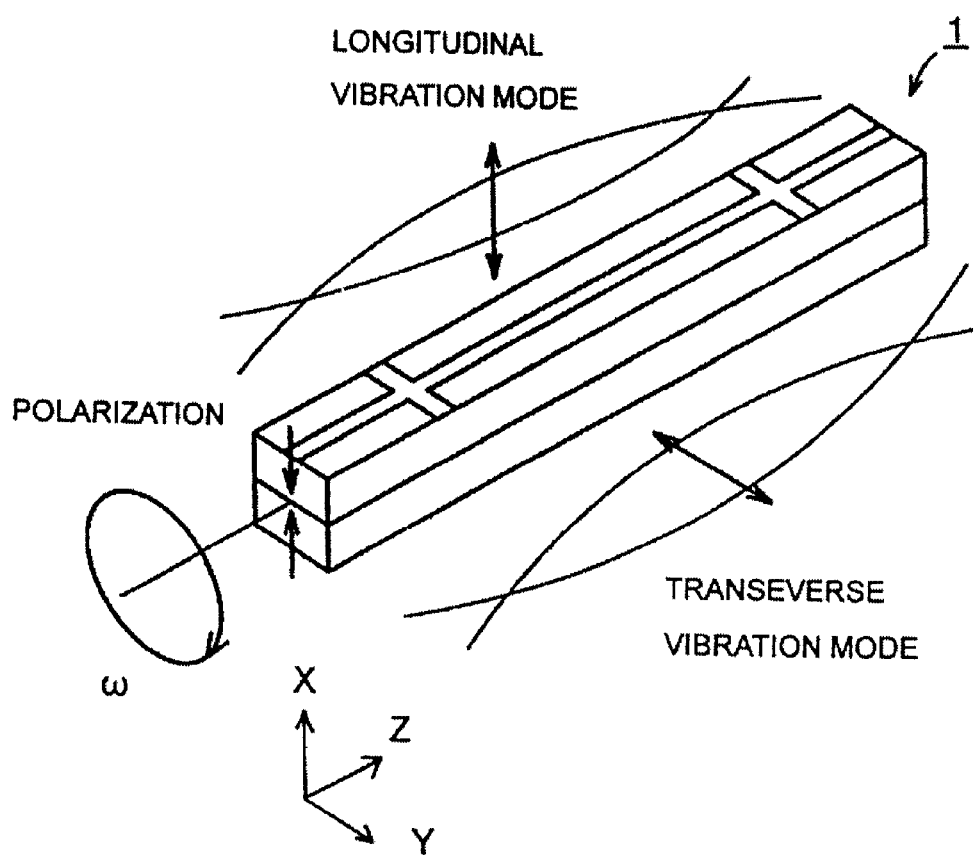
FIG. 4 is an external perspective view of a bimorph vibrator.

FIG. 3 is a block diagram of another example of the DSP 20 according to a second embodiment of the present invention. In the example shown in FIG. 2, the L signal and the R signal are separately converted into digital signals, and the Coriolis component is extracted. In the example shown in FIG. 3, the Coriolis component is extracted based on the L–R differential signal.

The L–R signal output from the differential amplifier circuit 3 shown in FIG. 1 is converted into a digital signal by an A/D converter 10. Based on the digital signal, a Hilbert transformer 21 outputs a signal (L–R)' shifted by π/2. The original L–R signal is squared by a multiplier 22, and the π/2-phase-shifted (L–R)' signal is squared by a multiplier 23. The squares are added by an adder 24, and the square root of the sum is computed by a square root circuit 25. Thus, the Coriolis component is extracted.

The above operation will now be illustrated using equations. The L–R differential signal is expressed as:

$$(L-R)=C*\sin(\omega t) \quad (8)$$

The Hilbert transformer 21 shifts the L–R signal by π/2 and outputs a π/2-phase-shifted signal expressed as:

$$(L-R)'=C*\cos(\omega t) \quad (9)$$

The multipliers 22 and 23 squares the respective signals, and the adder 24 adds the squares and obtains a sum expressed as:

$$X=(L-R)*(L-R)+(L-R)'*(L-R)'=C*C \quad (10)$$

The square root circuit 25 computes the square root X' of X expressed as equation (10), that is, computes X'=√C(=2B), and refers to the magnitude of the Coriolis signal.

As described above, in the example shown in FIG. 3, the Coriolis component is obtained based on the L–R signal. As a result, the configuration becomes simpler than that shown in FIG. 2.

It is to be understood that the embodiments herein disclosed are taken as examples and that the invention is not limited to the disclosed embodiments. The scope of the invention is defined by the appended claims rather than by the foregoing description, and the invention is intended to cover equivalent arrangements and changes that fall within the scope of the appended claims.

What is claimed is:

1. An angular velocity sensor for driving a vibrator in an X-axis direction and for detecting angular velocity based on vibrations caused by a Coriolis force generated in a Y-axis direction when said vibrator rotates about a Z-axis, said angular velocity sensor comprising:

a vibrator outputting a left signal and a right signal;

a drive circuit connected to the vibrator;

a converter connected to the vibrator for digitizing said left signal and said right signal; and an arithmetic operation unit for generating π/2 phase shifted signals and computing and outputting a magnitude of the Coriolis force based on the left and right signals and on the π/2 phase shifted signals.

2. An angular velocity sensor according to claim 1, wherein said arithmetic operation unit comprises:

a differential amplifier circuit for determining a differential signal;

a phase circuit for shifting the phase of the differential signal by π/2 to produce a π/2 phase shifted differential signal;

a first multiplier circuit for squaring the differential signal;

a second multiplier circuit for squaring the π/2 phase shifted differential signal generated by said phase circuit;

an adder circuit for adding the output of said first multiplier circuit and the output of said second multiplier circuit; and a square root circuit for computing the square root of the output of said adder circuit.

3. An angular velocity circuit according to claim 2, wherein the phase circuit is a Hilbert transformer.

4. An angular velocity circuit according to claim 1, wherein said arithmetic operation unit comprises:

phase circuits for shifting the phase of the respective left and right signals by π/2;

first multiplier circuits for squaring the respective original left and right signals;

second multiplier circuits for squaring the respective π/2-phase-shifted left and right signals generated by said phase circuits;

a first adder circuit for adding the squared left signal obtained by the corresponding first multiplier circuit and the squared π/2-phase-shifted left signal obtained by the corresponding second multiplier circuit;

a second adder circuit for adding the squared right signal obtained by the corresponding first multiplier circuit and the squared π/2-phase-shifted right signal obtained by the corresponding second multiplier circuit;

a first square root circuit for computing the square root of the output of said first adder circuit;

a second square root circuit for computing the square root of the output of said second adder circuit; and a subtracter circuit for computing the difference between the outputs of said first and said second square root circuits, dividing the difference in two, and outputting the halved difference.

5. An angular velocity circuit according to claim 4, wherein the phase circuits are Hilbert transformers.

6. An angular velocity sensor for driving a vibrator in an X-axis direction and for detecting angular velocity based on vibrations caused by a Coriolis force generated in a Y-axis direction when said vibrator rotates about a Z-axis, said angular velocity sensor comprising:

a vibrator outputting a left signal and a right signal;

a drive circuit connected to the vibrator; and an arithmetic operation unit connected to the vibrator to obtain said left signal and said right signal, wherein the arithmetic operation unit computes and outputs the magnitude of the Coriolis force based on said left signal and said right signal.

7. An angular velocity sensor according to claim 6, wherein the arithmetic operation unit phase shifts the left and right signals by $\pi/2$ to produce $\pi/2$ phase shifted left and right signals.

8. An angular velocity sensor according to claim 7, wherein the arithmetic operation unit computes the magnitude of the Coriolis force based on the left and right signals and the $\pi/2$ phase shifted left and right signals.

9. An angular velocity sensor according to claim 7, wherein the arithmetic operation unit computes the magnitude of the Coriolis force by determining X by adding the square of the left signal and the square of the $\pi/2$ phase shifted left signal, and determining Y by adding the square of the right signal and the square of the $\pi/2$ phase shifted right signal; then determining X' by taking the square root of X, and determining Y' by taking the square root of Y; and then determining the magnitude of the Coriolis force by subtracting Y' form X' and dividing the result by 2.

10. An angular velocity sensor according to claim 6, wherein the arithmetic operation unit computes the magnitude of the Coriolis force based on a differential signal of the left and right signals obtained from the vibrator.

11. An angular velocity sensor according to claim 10, wherein the arithmetic operation unit phase shifts the differential signal by $\pi/2$.

12. An angular velocity sensor according to claim 11, wherein the arithmetic operation unit computes the magnitude of the Coriolis force based on the differential signal and the $\pi/2$ phase shifted differential signal.

13. An angular velocity sensor according to claim 11, wherein the arithmetic operation unit computes the magnitude of the Coriolis force by halving the square root of the sum of the square of the differential signal and the square of the $\pi/2$ phase shifted differential signal.

14. An angular velocity sensor according to claim 6, wherein the driving circuit supplies a drive voltage at a substantially constant level.

15. An angular velocity sensor according to claim 6, wherein the driving circuit adds the left and right signals, adjusts the phase of the added signal, and applies the phase adjusted signal to the vibrator.

16. An angular velocity sensor according to claim 6, wherein the arithmetic operation unit computes the magnitude of the Coriolis force by digitizing the left and right signals.

17. An angular velocity sensor according to claim 10, wherein the arithmetic operation unit computes the magnitude of the Coriolis force by digitizing the differential signal.

* * * * *